United States Patent [19]

Shuster et al.

[11] Patent Number: 4,675,254
[45] Date of Patent: Jun. 23, 1987

[54] ELECTROCHEMICAL CELL AND METHOD

[75] Inventors: Nicholas Shuster, Madison; Jerome F. Pallat, Fairport Harbor, both of Ohio

[73] Assignee: Gould Inc., Rolling Meadows, Ill.

[21] Appl. No.: 829,323

[22] Filed: Feb. 14, 1986

[51] Int. Cl.$^4$ .............. H01M 2/38; H01M 2/36; C25B 9/00; C25B 13/00

[52] U.S. Cl. .................. 429/51; 429/72; 429/206; 429/210; 204/263; 204/275; 204/282; 204/290 R; 204/292

[58] Field of Search .......... 204/275, 269, 263, 255, 204/257, 290 R, 292; 429/70, 72, 38–39, 49, 14, 67, 206, 210, 51

[56] References Cited

U.S. PATENT DOCUMENTS

| | | | |
|---|---|---|---|
| 2,777,811 | 1/1957 | McRae et al. | 204/257 X |
| 3,432,353 | 3/1969 | Krusenstierna et al. | 429/39 |
| 3,657,099 | 4/1972 | Seko et al. | 204/269 X |
| 3,840,455 | 10/1974 | Cooley et al. | 204/275 X |
| 4,269,907 | 5/1981 | Momyer et al. | 429/67 |
| 4,555,454 | 11/1985 | Shuster | 429/81 X |

Primary Examiner—Donald R. Valentine
Attorney, Agent, or Firm—Wood, Dalton, Phillips, Mason & Rowe

[57] ABSTRACT

A method of improving performance in an electrochemical cell having a consumable metal anode defining an anode face and a cathode spaced from the anode face and defining an electrolyte flow channel therebetween whereby an aqueous alkaline electrolyte flows through a system of flow baffles disposed in the electrolyte flow channel of the cell. The flow baffles define an electrolyte flow path having a directional vector component perpendicular to a sufficient component of a flow vector of the electrolyte to increase the speed at which the electrolyte passes across the anode face at any selected volumetric flow rate as compared to an otherwise identical cell without such baffles.

34 Claims, 6 Drawing Figures

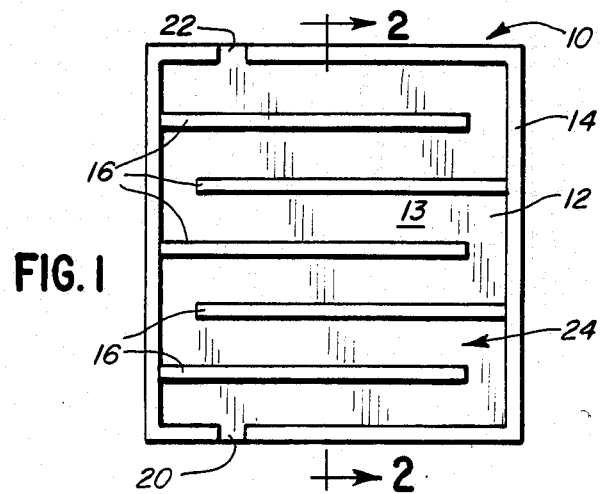
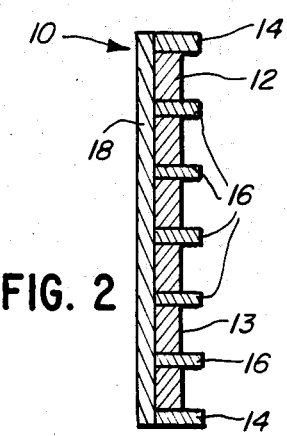
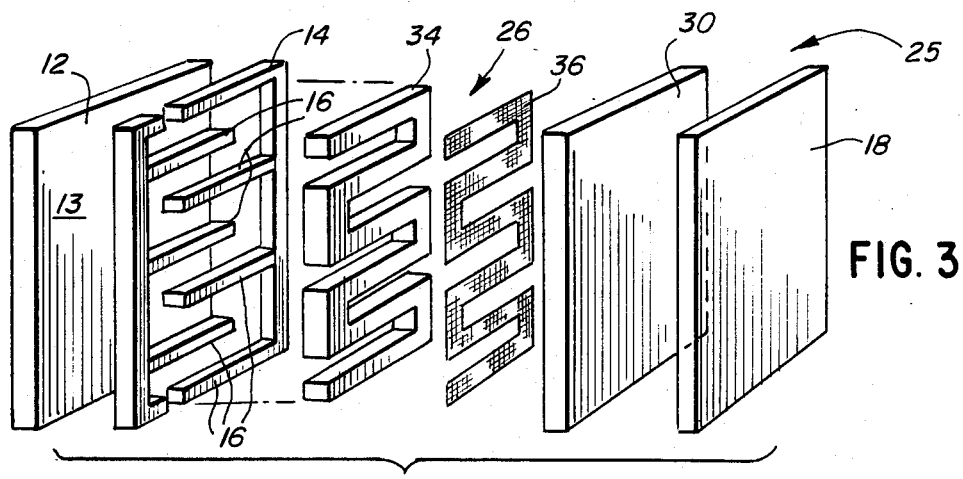
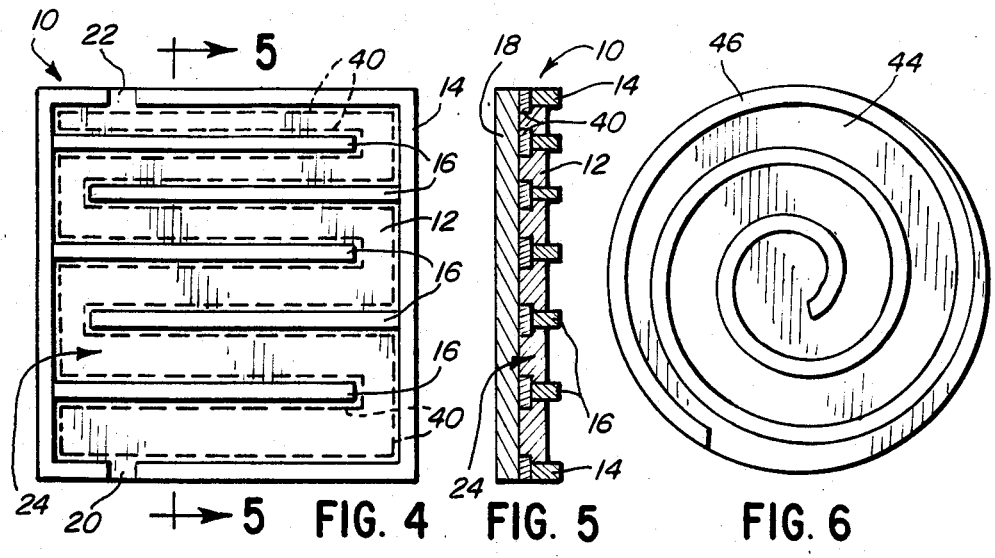
FIG. 1  FIG. 2  FIG. 3  FIG. 4  FIG. 5  FIG. 6

ELECTROCHEMICAL CELL AND METHOD

BACKGROUND OF THE INVENTION

1. Field of the Invention

This invention relates generally to electrochemical cells and, more specifically, this invention relates to consumable anode/aqueous alkaline electrolyte electrochemical cells which are capable of sustaining performance with lower volumetric flow rates of electrolyte.

2. Description of the Related Art

Electrochemical cells utilizing consumable metal anodes are well known. Typically, the anode comprises a reactive metal, such as an alkali metal, in conjunction with a cathode and an aqueous alkaline electrolyte. In a preferred form, the anode is lithium, and the electrolyte comprises an aqeuous solution of lithium hydroxide.

The cell disclosed in Rowley U.S. Pat. No. 3,791,871 (Feb. 12, 1974), the disclosure of which is hereby incorporated by reference, typifies prior electrochemical cells. Briefly, the cell utilizes a reactive metal anode highly reactive with water and spaced from a cathode by an electrically insulating film formed on the anode in the presence of water. the anode and cathode are each in contact with an aqueous electrolyte during operation. In the embodiment shown in the Rowley patent, the anode is formed of an alkali metal such as sodium or lithium and, during operation of the cell, the electrolyte is formed by the electrochemical reaction of water and the anodic metal. The electrolyte is preferably an alkali metal hydroxide of the alkali metal utilized as the anode since such a hydroxide is naturally formed during operation of the cell and hence automatically regenerates the electrolyte during operation.

Due to anode sensitivity, however, there are a number of limitations to performance by the basic electrochemical cell. Performance of the cell undesirably fluctuates with changes in the electrolyte flow rates, with high power densities being realized at high pumping speeds. Preferably, high power densities should be achieved at low pumping speeds in order to reduce the power requirements for the pump.

Further, it is also desirable to have power remain constant over a broad range of flow rates so as to simplify multi-cell battery design.

SUMMARY OF THE INVENTION

It is an object of the present invention to overcome one or more of the problems described above.

According to the present invention, an electrochemical cell includes means disposed in the electrolyte flow channel defined between the anode and cathode for increasing the speed at which electrolyte passes through the flow channel and across the face of the anode at any selected volumetric flow rate as compared to an otherwise identical cell without the speed increasing means. The use of such speed increasing means reduces the volumetric flow rate of electrolyte required to sustain cell performance or, alternatively, increases the power output at any given volumertric flow rate.

The speed increasing means may be in the form of baffles defining an electrolyte flow path having a directional vector component perpendicular to a sufficient component of the flow vector of the electrolyte to increase the speed at which the electrolyte passes through the flow channel and across the anode face. The baffles may be arranged in any of a number of configurations, such as a zig-zag or spiral arrangement.

In addition to the electrochemical cell, the present invention comprehends a method of generating electrical energy in an aqueous electrolyte/consumable metal anode electrochemical cell.

Other objects and advantages of the invention will be apparent to those skilled in the art from the following detailed description taken in conjunction with the drawings and appended claims.

BRIEF DESCRIPTION OF THE DRAWINGS

FIG. 1 is an overhead plan view of a baffled electrode plate assembly according to a typical embodiment of the present invention.

FIG. 1 is a cross-sectional view of the baffled electrode plate assembly shown in FIG. 1 as taken along line 2—2 of FIG. 1 and viewed in the direction of the arrows.

FIG. 3 is an exploded perspective view of an electrochemical cell according to a typical embodiment of the present invention.

FIG. 4 is an overhead plan view of a baffled electrode plate assembly according to an alternative embodiment of the present invention.

FIG. 5 is a cross-sectional view of the baffled electrode plate assembly shown in FIG. 4 and taken along line 5—5 of FIG. 4, and viewed in the direction of the arrows.

FIG. 6 is an overhead plan view of a baffled electrode plate assembly according to another embodiment of the present invention.

DETAILED DESCRIPTION OF THE INVENTION

Referring initially to FIGS. 1 and 2, a baffled electrode plate assembly, generally designated 10, is shown. The baffled electrode plate assembly 10 includes a consumable metal anode 12 which defines an anode face 13, with a peripheral wall 14 and baffles 16 bonded to or integral with the wall 14. The peripheral wall 14 and the baffles 16 may be made of any material stable and nonreactive in an alkaline medium and also stable in the electrochemical environment of the anodic material. For example, baffles 16 and walls 14 of Noryl (a trademark of General Electric Company) material have been successfully tested in lithium/silver oxide batteries according to the invention.

The anode 12 is adhered to a conductive metal (e.g. nickel) substrate or bipolar plate 18 (shown in FIG. 2), as in the well-known bipolar electrode assembly, described below.

The baffled electrode plate assembly 10 is shown with an electrolyte inlet 20 and an electrolyte outlet 22 formed in the wall 14, and five baffles 16. It is understood that the positioning of the electrolyte inlet and the electrolyte outlet can be varied to meet specific design criteria and needs. Also, the number of baffles can be varied to meet specific applications. The baffles 16 define an electrolyte flow path 24, through which the electrolyte of the cell passes, that is illustratively substantially zig-zag in configuration.

The anode typically is of an alkali metal such as sodium, for example, and preferably is of lithium. The anodic metal may be present in elemental, compound, complex, amalgam or mixture form, as is well known in the art.

The baffles 16 may be in contact with or bonded to the anode face 13, but generally will extend through the anode into contact with the bipolar plate 18, as shown in FIG. 2. In a preferred embodiment, the baffles or flow channeling devices extend through the entire gap between the anode and the cathode of a cell and are in direct contact with both the anode and cathode. The baffles 16 serve as an integral support system, eliminating the need for other support system elements such as beads or spacer cylinders.

The baffles 16 function as means for increasing the linear speed of electrolyte flow across the anode face 13 at any given volumetric flow rate. Thus, for any given desired level of power output, the baffles 16 permit the use of lower volumetric flow rates of electrolyte. Thus, higher power densities can be achieved at lower pumping speeds, thereby reducing pumping power requirements. Furthermore, the volumetric flow requirements of an electrochemical cell wherein such speed increasing means are used remain low for a considerable period of time, thereby simplifying multi-cell battery design.

The foregoing results are due to the fact that the electrochemical reaction between the electrolyte and the anode is a surface phenomenon, the rate of which depends, at least in part, on mass transport phenomena occurring at the anode face 13. An increase in electrolyte flow velocity across the face 12 results in an increase in reaction rate and, hence, the rate of power output of the cell.

FIG. 2 best illustrates the preferred embodiment of the invention wherein the baffles extend entirely through the anode 12 into direct contact with the bipolar plate 18. As the anode 12 erodes, the baffles remain undisturbed.

As illustrated in FIG. 3, the present invention can be embodied in an electrochemical cell incorporating an interelectrode separator system. In addition to the consumable metal anode 12, the peripheral wall 14, and the baffles 16, as illustrated in FIGS. 1 and 2, a cell 25 of FIG. 3 includes an interelectrode separator system 26, a cathode 30 and a bipolar plate 18.

The bipolar plate 18 is generally used only in a multi-cell assembly of several cells 25, wherein a cathode 30 is bonded to one side of the plate 18 and an anode 12 of an adjacent cell is bonded to the other side. The bipolar plate to which the anode 12 of FIG. 3 is bonded is not shown, for simplicity.

The cathode 30 may be of any suitable metal, such as iron or silver oxide, or may be a gas consuming cathode such as an air cathode. The interelectrode separator system 26 comprises a foam layer 34 and a screen layer 36. Both the foam layer 34 and the screen layer 36 fit snugly in the electrolyte flow channel within the electrolyte flow path defined by baffles 16. The foam and the screen can be made of conventional materials as are well known in the art, such as, for example, reticulated polyurethane foam and Vexar (a trademark of E. I. DuPont de Nemours and Company) screen, respectively.

The foam 34 is preferably positioed directly against the anode face 13 and the screen 36 is positioned against the cathode 30, as described in copending, commonly assigned application of Shuster, et al. Ser. No. 808,096 filed Dec. 12, 1985, the disclosure of which is hereby incorporated by reference.

In FIGS. 1-3, the baffles 16 are illustrated as parallel and equally spaced. Equal spacing of the baffles, however, is not required to attain benefits from the present invention and, in fact, unequal spacing may be desired. FIGS. 4 and 5 illustrate an embodiment of the invention wherein the baffles 16 are positioned closer to one another near the electrolyte outlet 22. The closer spacing of the baffles 16 serves to compensate somewhat for the higher temperature and concentration of electrolyte realized near the electrolyte outlet. thus, a practitioner can balance the need for higher velocities with the concentration of electrolyte as it varies at any point along the electrolyte flow path 24 defined in the electrolyte flow channel.

As best seen in FIG. 5, a coating 40 of an electrically insulative polymeric material, such as Lucite (a trademark of E. I. Dupont de Nemours and Company), is plced on the bipolar plate 18 beneath the baffles 16. During discharge, the anodic material is consumed in a non-uniform manner, and as the discharge progresses, the surface of the anode may become highly irregular due to local variations in electrolyte flow velocity, temperature, concentration and/or current density. Toward the end of discharge, when the average thickness of the anodic material is small, some thin spots in the anodic material will break through the anode and expose the substrate bipolar plate or current collector in the immediate vicinity of the baffrles 16. This "breakthrough" phenomenon can set up a localized lithium-water battery couple which locally produces heat, hydrogen gas and, perhaps most detrimentally, lowers the battery voltage. The Lucite coating, being nonconductive, serves to minimize this detrimental process by electrically insulating the bipolar plate.

In FIGS. 1-5, the electrodes are shown as having a square shape, but it is to be understood that practice of the present invention is not limited to square electrodes and may be practices with electrochemical electrodes of various shapes and sizes.

FIG. 6 illustrates an embodiment of the invention wherein an electrode 44 has a circular shape and a peripheral wall and baffle 46 is bonded to the electrode 44 in a spiral arrangement and in a manner resulting an electrolyte flow path which is substantially in a spiral arrangement. The peripheral wall/baffle needs only have a directional vector component perpendicular to a sufficient component of the flow vector of the electrolyte passing through the cell so as to increase the speed at which the electrolyte passes through the flow channel of the cell at any selected volumetric flow rate as compared to an otherwise identical cell without the peripheral wall/baffle.

The invention has been tested in a cell including a square lithium anode and a square silver oxide cathode, as shown in FIGS. 1-3. Each electrode had an original working surface area of four square inches. The lithium anode has a thickness of 0.054 inch, and teh silver oxide cathode had a thickness of 0.045 inch, and a weight of 15.5 g.

The baffles and the peripheral wall of the cell were prepared from strips of Noryl (a trademark of General Electric Company), and had a thickness corresponding to the interelectrode gap (0.021 inch) plus the thickness of the anode (0.054 inch). About one-half square inch of anode surface area was sacrificed for the baffles and the wall, leaving a working surface area of 3.5125 square inches. Additionally, an interelectrode separator system was incorporated in the cell. The interelectrode separator system included a layer of 40 ppi, 3/32" (before compression) polyurethane foam against the lithium anode and a 17 mil polypropylene screen (Style 7715 from Lamport's Filter Media, Cleveland, Ohio) against the silver oxide cathode.

Lithium hydroxide electrolyte, having a molarity of 4.3 and at a temperature of 45° C., was permitted to flow across the lithium anode face so as to give a constant power output of about (1.72 W/cm$^2$) for over 8 minutes. It was found that the volumetric flow requirement remained low for a considerable period of time (over 6 minutes) when compared with conventional cell design. As expected, however, the flow requirement increased near the end of the run, as is typically associated with increased hydrogen gas production associated with "breakthrough" of the anode near the edges of the baffles.

A substantially identical cell was contructed and tested under similar conditions, except that a Lucite coating was disposed betweenthe bipolar plate and the flow baffles in order to minimize or eliminate anode breakthrough near the baffles. The run time for the cell operated at a constant voltage of 2.1 V was extended to well over 10 minutes before the test was terminated.

The foregoing detailed description is given for clearness of understanding only, and no unnecessary limitation should be understood therefrom, as modifications within the scope of the invention will be obvious to those skilled in the art.

We claim:

1. An electrochemical cell, comprising:
a consumable anode defining a face;
a cathode spaced from said anode face and defining a cathode face opposing said anode face, said cathode face and said anode face defining an electrolyte flow channel therebetween, said flow channel having an inlet and an outlet; each of said anode face and said cathode being adapted to be in direct contact with an aqueous alkaline electrolyte during operation of said cell; and,
a plurality of baffles disposed in said electrolyte flow channel in contact with said anode and with said cathode face and defining an electrolyte flow path having a directional vector component perpendicular to a sufficient component of the flow vector of said electrolyte to increase the speed at which said electrolyte passes through said flow channel and across said anode face at any selected volumetric flow rate as compared to an otherwise identical cell without said baffles.

2. The electrochemical cell of claim 1, further comprising an interelectrode electrode separator disposed in said electrolyte flow channel in addition to said baffles.

3. The electrochemical cell of claim 2 wherein said electrode separator comprises a layer of foam in contact with said anode face and an adjacent screen in contact with said cathode.

4. The electrochemical cell of claim 1 wherein said anode is adhered to a conductive metal substrate and said baffles extend through said anode and have a front face in contact with said substrate and an opposed back face in contact with said cathode.

5. The electrochemical cell of claim 4 wherein said baffles further comprise a non-reactive insulating coating between said baffles and said metal substrate.

6. An electrochemical cell, comprising:
a consumable anode defining a face;
a cathode spaced from said anode face, said cathode and said anode face defining an electrolyte flow channel therebetween, said flow channel having an inlet and an outlet; each of said anode face and said cathode being adapted to be in direct contact with an aqeuous alkaline electrolyte during operation of said cell; and,
a plurality of baffles disposed in said electrolyte flow channel defining an electrolyte flow path having a directional vector component perpendicular to a sufficient component of a flow vector of said electrolyte to increase the speed at which said electrolyte passes across said anode face at any selected volumetric flow rate as compared to an otherwise identical cell without said baffles, said baffles being parallel and spaced from each other in the direction of said flow vector, wherein the baffles disposed near the outlet of said electrolyte flow channel are spaced closer together in the direction of said flow vector than the baffles near the inlet of said electrolyte flow channel.

7. An electctrochemical cell, comprising:
a consumable anode defining a face;
a cathode spaced from said anode face, said cathode and said anode face defining an electrolyte flow channel therebetween, said flow channel having an inlet and an outlet; each of said anode face and said cathode being adapted to be in direct contact with an aqueous alkaline electrolyte during operation of said cell; and,
a plurality of baffles disposed in said electrolyte flow channel defining an electrolyte flow path having a directional vector component perpendicular to a sufficient component of a flow vector of said electrolyte to increase the speed at which said electrolyte passes across said anode face at any selected volumetric flow rate as compared to an otherwise identical cell without said baffles wherein said consumable anode comprises an alkali metal.

8. The electrochemical cell of claim 7 wherein said alkali metal comprises lithium.

9. An electrochemical cell, comprising:
a consumable anode defining a face;
a cathode spaced from said anode face, said cathode and said anode face defining an electrolyte flow channel therebetween, said flow channel having an inlet and an outlet; each of said anode face and said cathode being adapted to be in direct contact with an aqueous alkaline electrolyte during operation of said cell; and,
a plurality of baffles disposed in said electrolyte flow channel defining an electrolyte flow path having a directional vector component perpendicular to a sufficient component of a flow vector of said electrolyte to increase the speed at which said electrolyte passes across said anode face at any selected volumetric flow rate as compared to an otherwise identical cell without said baffles wherein said cathode comprises silver oxide.

10. An electrochemical cell, comprising:
an alkali metal anode defining an anode face;
a silver oxide cathode spaced from said anode face and defining a cathode face opposing said anode face, said cathode face and said anode face defining an electrolyte flow channel therebetween, said flow channel having an inlet and an outlet, each of said anode face and said cathode being adapted to be in direct contact with an aqueous alkaline electrolyte during operation of said cell; and,
a plurality of baffles in contact with said anode and with said cathode face and defining a substantially zig-zag electrolyte flow path disposed in said electrolyte flow channel, said flow path having a directional vector component perpendicular to a sufficient component of the flow vector of said electrolyte to increase the speed at which said electrolyte passes through said flow channel and across said anode faces at any selected volumetric flow rate as compared to an otherwise identical cell without said baffles.

11. The electrochamical cell of claim 10 wherein said baffles are parallel and spaced frome ach other in the direction of said flow vector.

12. The electrochemical cell of claim 11 wherein the baffles disposed near the outlet of said electrolyte flow channel are spaced closer together in the direction of said flow vector than the baffles near the inlet of said electrolyte flow channel.

13. The electrochemical cell of claim 10 wherein said alkali metal comprises lithium.

14. The electrochemical cell of claim 14, further comprising an electrode separator disposed in said electrolyte flow channel in addition to said baffles.

15. The electrochemical cell of claim 14 wherein said electrode separator comprises a layer of foam in contact with said anode face and an adjacent screen in contact with said cathode.

16. The electrochemical cell of claim 10 wherein said anode is adhered to a conductive metal substrate and said baffles extend through said anode and have a front face in contact with said substrate and an opposed back face in contact with said cathode.

17. The electrochemical cell of claim 16 wherein said baffles further comprise a non-reactive insulating coating between said baffles and said metal substrate.

18. A method of generating electrical energy with an aqeuous/metal electrochemical cell comprising a consumable metal anode defining an anode face and a cathode spaced from said anode face to define a cathode face opposing said anode face, said cathode face and said anode face defining an electrolyte flow channel having an inlet and an outlet, with a circuit connection between said anode and cathode, each of said anode face and said cathode being adapted to be in direct contact with an aqueous alkaline electrolyte during operation of said cell, said method comprising the step of:
  flowing an aqueous alkaline electrolyte through a plurality of flow baffles in contact with said anode and with said cathode face and disposed in said electrolyte flow channel, said flow baffles defining an electrolyte flow path having a directional vector component perpendicular to a sufficient component of the flow vector of said electrolyte to increase the speed at which said electrolyte passes across said anode face.

19. The method of claim 18, further comprising an interelectrode electrode separator disposed in said electrolyte flow channel in addition to said means for increasing the speed at which said electrolyte passes across said anode face.

20. A method of generating electrical energy with an aqeuous/metal electrochemical cell comprising a consumable metal anode defining an anode face and a cathode spaced from said anode face to define an electrolyte flow channel having an inlet and an outlet, with a circuit connection between said anode and cathode, said method comprising the step of:
  flowing an aqeuous alkaline electrolyte through a system of flow baffles disposed in said electrolyte flow channel, said flow baffles defining an electrolyte flow path having a directional vector component perpendicular to a sufficient component of the flow vector of said electrolyte to increase the speed at which said electrolyte passes across said anode face, said baffles being parallel and spaced from each other in the direction of said flow vector and wherein the baffles disposed near the outlet of said electrolyte flow channel are spaced closer together in the direction of said flow vector than the baffles near the inlet of said electrolyte flow channel.

21. A method of generating electrical energy with an aqueous/metal electrochemical cell comprising a consumable metal anode defining an anode face and a cathode spaced from said anode face to define an electrolyte flow channel having an inlet and an outlet, with a circuit connection between said anode and cathode, said method comprising the step of:
  flowing an aqeuous alkaline electrolyte through a system of flow baffles disposed in said electrolyte flow channel, said flow baffles defining an electrolyte flow path having a directional vector component perpendicular to a sufficient component of the flow vector of said electrolyte to increase the speed at which said electrolyte passes across said anode face wherein said consumable anode comprises an alkali metal.

22. The method of claim 21 wherein said alkali metal comrises lithium.

23. A method of generating electrical energy with an aqeuous/metal electrochemical cell comprising a consumable metal anode defining an anode face and a cathode spaced from said anode face to define an electrolyte flow channel having an inlet and an outlet, with a circuit connection between said anode and cathode, said method comprising the step of:
  flowing an aqeuous alkaline electrolyte through a system of flow baffles disposed in said electrolyte flow channel, said flow baffles defining an electrolyte flow path having a directional vector component perpendicular to a sufficient component to the flow vector of said electrolyte to increase the speed at which said electrolyte passes across said anode face wherein said cathode comprises silver oxide.

24. A method of generating electrical energy with an aqueous/metal electrochemical cell comprising a consumable metal anode defining an anode face and a cathode spaced from said anode face to define an electrolyte flow channel having an inlet and an outlet, with a circuit connection between said anode and cathode, said method comprising the step of:
  flowing an aqeuous alkaline electrolyte through a system of flow baffles disposed in said electrolyte flow channel, said flow baffles defining an electrolyte flow path having a directional vector component perpendicular to a sufficient component of the flow vector of said electrolyte to increase the speed at which said electrolyte passes across said anode face, said cell further comprising an electrode separator disposed in said electrolyte flow channel in addition to said baffles, said electrode separator comprising a layer of foam in contact with said anode face and an adjacent screen in contact with said cathode.

25. A method of generating electrical energy with an aqeuous/metal electrochemical cell comprising a consumable metal anode defining an anode face and a cathode spaced from said anode face to define an electrolyte flow channel having an inlet and an outlet, with a circuit connection between said anode and cathode, said method comprising the step of:

flowing an aqeuous alkaline electrolyte through a system of flow baffles disposed in said electrolyte flow channel, said flor baffles defining an electrolyte flow path having a directional vector component perpendicular to a sufficient component of the flow vector of said electrolyte to increase the speed at which said electrolyte passes across said anode face, said cell further comprising an electrode separator disposed in said electrolyte flow channel in addition to said baffles, said anode being adhered to a conductive metal substrate and said baffles extending through said anode and having a front face in contact with said substrate and an opposed back face in contact with said cathode.

26. The method of claim 25 wherein said baffles further comprise a non-reactive insulating coating between said baffles and said metal substrate.

27. A method of generating electrical energy with an electrochemical cell comprising an alkali metal anode defining an anode face and a silver oxide cathode spaced from said anode face and defining a cathode face opposing said anode face, said cathode face and said anode face defining an electrolyte flow channel therebetween, said flow channel having an inlet and an outlet, each of said anode face and said cathode being adapted to be in direct contact with an aqeuous alkaline electrolyte during operation of said cell, said method comprising the step of:

flowing an aqeuous alkaline electrolyte through said electrolyte flow channel, said electrolyte flow channel having a plurality of baffles disposed therein, said baffles in contact with said anode and with said cathode face and defining an electrolyte flow path, said flow path having a directional vector component perpendicular to a sufficient component of the flow vector of said electrolyte to increase the speed at which said electrolyte passes through said flow channel and across sadi anode face at any selected volumetric flow rate as compared to an otherwise identical cell without said baffles.

28. The method of claim 27 wherein said baffles are parallel and spaced from each other in the direction of said flow factor.

29. The method of claim 28 wherein the baffles disposed near the outlet of said electrolyte flow channel are spaced closer together in a direction of said flow vector than the baffles near the inlet of said electrolyte flow channel.

30. The method of claim 27 wherein said alkali metal comprises lithium.

31. The method of claim 27 wherein said electrochemical cell further comprises an electrode separator disposed in said electrolyte flow channel in addition to said baffles.

32. The method of claim 31 wherein said electrode separator comprises a layer of foam in contact with said anode face and an adjacent screen in contact with said cathode.

33. The method of claim 27 wherein said anode is adhered to a conductive metal substrate and said baffles extend to said anode and have a front face in contact with said substrate and an opposed back face in contact with said cathode.

34. The method of claim 33 wherein said baffles further comprise a non-reactive insulating coating between said baffles and said metal substrate.

* * * * *